United States Patent
Schwartz et al.

(10) Patent No.: US 12,456,182 B2
(45) Date of Patent: Oct. 28, 2025

(54) ANOMALY DETECTION USING MASKED AUTO-ENCODER

(71) Applicant: International Business Machines Corporation, Armonk, NY (US)

(72) Inventors: Eliyahu Schwartz, Haifa (IL); Leonid Karlinsky, Acton, MA (US); Sivan Harary, Manof (IL); Assaf Arbelle, Lehvot Haviva (IL)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 18/184,911

(22) Filed: Mar. 16, 2023

(65) Prior Publication Data
US 2024/0311987 A1    Sep. 19, 2024

(51) Int. Cl.
*G06N 3/0455* (2023.01)
*G06T 7/00* (2017.01)

(52) U.S. Cl.
CPC ......... *G06T 7/0002* (2013.01); *G06N 3/0455* (2023.01); *G06T 2207/10024* (2013.01); *G06T 2207/20021* (2013.01); *G06T 2207/20081* (2013.01)

(58) Field of Classification Search
CPC ...... G06N 3/045; G06N 3/0455; G06N 3/088; G06T 2207/10024; G06T 2207/20021; G06T 2207/20081; G06T 7/0002
See application file for complete search history.

(56) References Cited

U.S. PATENT DOCUMENTS

| | | | | |
|---|---|---|---|---|
| 2022/0164626 | A1* | 5/2022 | Bird | G06N 3/084 |
| 2022/0335631 | A1* | 10/2022 | Denney | G06T 7/0004 |
| 2023/0206067 | A1* | 6/2023 | Wang | G06N 3/0455 |
| | | | | 382/155 |
| 2023/0410483 | A1* | 12/2023 | Chen | G06V 10/82 |
| 2024/0096072 | A1* | 3/2024 | He | G06V 10/26 |
| 2024/0169541 | A1* | 5/2024 | Zhang | G06T 7/11 |
| 2024/0221128 | A1* | 7/2024 | Chen | G06N 3/096 |

FOREIGN PATENT DOCUMENTS

| | | |
|---|---|---|
| CN | 112767331 A | 5/2021 |
| CN | 113487571 A | 10/2021 |

OTHER PUBLICATIONS

Chaoqin Huang et al., "Self-Supervised Masking for Unsupervised Anomaly Detection and Localization," May 13, 2022, Computer Vision and Pattern Recognition (cs.CV), pp. 1-11.*

(Continued)

*Primary Examiner* — Omar S Ismail
(74) *Attorney, Agent, or Firm* — Stosch Sabo

(57) ABSTRACT

An example system includes a processor that can randomly mask tokens using different masks to generate different subsets of masked tokens. The processor can process the different sets of masked tokens via a pretrained masked auto-encoder (MAE) encoder to output intermediate representations. The processor can process the intermediate representations via a pretrained MAE decoder to output reconstructed images. The processor can further compare input image with the output reconstructed images to generate an anomaly score.

20 Claims, 5 Drawing Sheets

(56) References Cited

OTHER PUBLICATIONS

Adín Ramírez Rivera et al.,"Anomaly Detection Based on Zero-Shot Outlier Synthesis and Hierarchical Feature Distillation," Jan. 5, 2022, IEEE Transactions on Neural Networks and Learning Systems, vol. 33, No. 1, Jan. 2022, pp. 281-285.*
Christoph Baur et al., "Autoencoders for unsupervised anomaly segmentation in brain MR images: A comparative study," Jan. 2, 2021, Medical Image Analysis 69 (2021), 101952, pp. 1-10.*
Yatian Pang et al.,"Masked Autoencoders for Point Cloud Self-supervised Learning," Nov. 11, 2022, Lecture Notes in Computer Science ((LNCS,vol. 13662)), pp. 604-616.*
Yu Tian et al.,"Unsupervised Anomaly Detection in Medical Images with a Memory-Augmented Multi-level Cross-Attentional Masked Autoencoder," 15th 2023, Lecture Notes in Computer Science ((LNCS,vol. 14349)), pp. 1-15.*
Adín Ramírez Rivera et al., "Anomaly Detection based on Zero-Shot Outlier Synthesis and Hierarchical Feature Distillation", Published in arxiv.org, Oct. 10, 2020, 16 pages.
Bauer, Alexander, "Self-Supervised Training with Autoencoders for Visual Anomaly Detection", Published in arxiv.org, Jun. 28, 2022, 9 pages.
Chaoqin Huang et al. "Self-Supervised Masking for Unsupervised Anomaly Detection and Localization", Journal of Latex Class Files, Jul. 2021, 15 pages.
Christoph Baur et al., "Autoencoders for Unsupervised Anomaly Segmentation in Brain MR Images: A Comparative Study", Journal of Latex Class Files, vol. 14, No. 8, Aug. 2015, 16 pages.
Yatian Pang et al., "Masked Autoencoders for Point Cloud Self-supervised Learning", arXIV, Mar. 2022, 18 pages.
Yu Tian et al., "Unsupervised Anomaly Detection in Medical Images with a Memory-augmented Muti-level Cross-attentional Masked Autoencoder", Published in arXiv.org, Mar. 22, 2022, 11 pages.
Bergmann et al., "MVTec AD—A Comprehensive Real-World Dataset for Unsupervised Anomaly Detection", International Journal of Computer Vision, Jan. 6, 2021, pp. 1038-1059.
Cohen et al., "Sub-Image Anomaly Detection with Deep Pyramid Correspondences", arXiv:2005.02357v3 [cs.CV], Feb. 3, 2021, 17 pages.
Defard et al., "PaDiM: a Patch Distribution Modeling Framework for Anomaly Detection and Localization", arXiv:2011.08785v1 [cs.CV], Nov. 17, 2020, 7 pages.
Geoffrey E. Hinton, "Connectionist learning procedures", Artificial Intelligence, Sep. 1989, pp. 185-234.
Goodfellow et al., "Generative adversarial nets", arXiv:1406.2661v1 [stat.ML], Jun. 10, 2014, 9 pages.
He et al., "Masked autoencoders are scalable vision learners", arXiv:2111.06377v3 [cs.CV], Dec. 19, 2021, 14 pages.
Huang et al., "Attribute restoration framework for anomaly detection", arXiv:1911.10676v3 [cs.CV], Dec. 12, 2020, 14 pages.
Japkowicz et al., "A novelty detection approach to classification", IJCAI'95: Proceedings of the 14th international joint conference on Artificial intelligence—vol. 1, Aug. 20, 1995, pp. 518-523.
Leo Tolstoy, "Anna karenina", https://www.goodreads.com/book/show/15823480-anna-karenina, Jan. 1, 1878, 550 pages.
Roth et al., "Towards total recall in industrial anomaly detection", arXiv:2106.08265v2 [cs.CV], May 5, 2022, 18 pages.
Sakurada et al., "Anomaly Detection Using Autoencoders with Nonlinear Dimensionality Reduction", MLSDA'14: Proceedings of the MLSDA 2014 2nd Workshop on Machine Learning for Sensory Data Analysis, Dec. 2, 2014, pp. 4-11.
Schlegl et al., "Unsupervised Anomaly Detection with Generative Adversarial Networks to Guide Marker Discovery", arXiv:1703.05921v1 [cs.CV], Mar. 17, 2017, 12 pages.
Yan et al., "Learning semantic context from normal samples for unsupervised anomaly detection", The Thirty-Fifth AAAI Conference on Artificial Intelligence (AAAI-21), May 2021, pp. 3110-3118.
Zavrtanik et al., "Reconstruction by inpainting for visual anomaly detection", Pattern Recognition, Apr. 2021, 16 pages.

* cited by examiner

ANOMALY DETECTION USING MASKED AUTO-ENCODER

BACKGROUND

The present techniques relate to detection of anomalies. More specifically, the techniques relate to automatic anomaly detection.

SUMMARY

According to an embodiment described herein, a system can include processor to randomly mask tokens using different masks to generate different subsets of masked tokens. The processor can also further process the different sets of masked tokens via a pretrained masked auto-encoder (MAE) encoder to output intermediate representations. The processor can also process the intermediate representations via a pretrained MAE decoder to output reconstructed images. The processor can then compare input image with the output reconstructed images to generate an anomaly score.

According to another embodiment described herein, a method can include randomly masking, via a processor, tokens using different masks to generate different subsets of masked tokens. The method can further include processing, via the processor, the different sets of masked tokens via a pretrained masked auto-encoder (MAE) encoder to output intermediate representations. The method can also further include processing, via the processor, the intermediate representations via a pretrained MAE decoder to output reconstructed images. The method can also include comparing, via the processor, input image with the output reconstructed images to generate an anomaly score.

According to another embodiment described herein, a computer program product for generating anomaly scores can include computer-readable storage medium having program code embodied therewith. The program code executable by a processor to cause the processor to randomly mask tokens using different masks to generate different subsets of masked tokens. The program code can also cause the processor to process the different sets of masked tokens via a pretrained masked auto-encoder (MAE) encoder to output intermediate representations. The program code can also cause the processor to process the intermediate representations via a pretrained MAE decoder to output reconstructed images. The program code can also cause the processor to compare input image with the output reconstructed images to generate an anomaly score.

DETAILED DESCRIPTION

Figure 1:
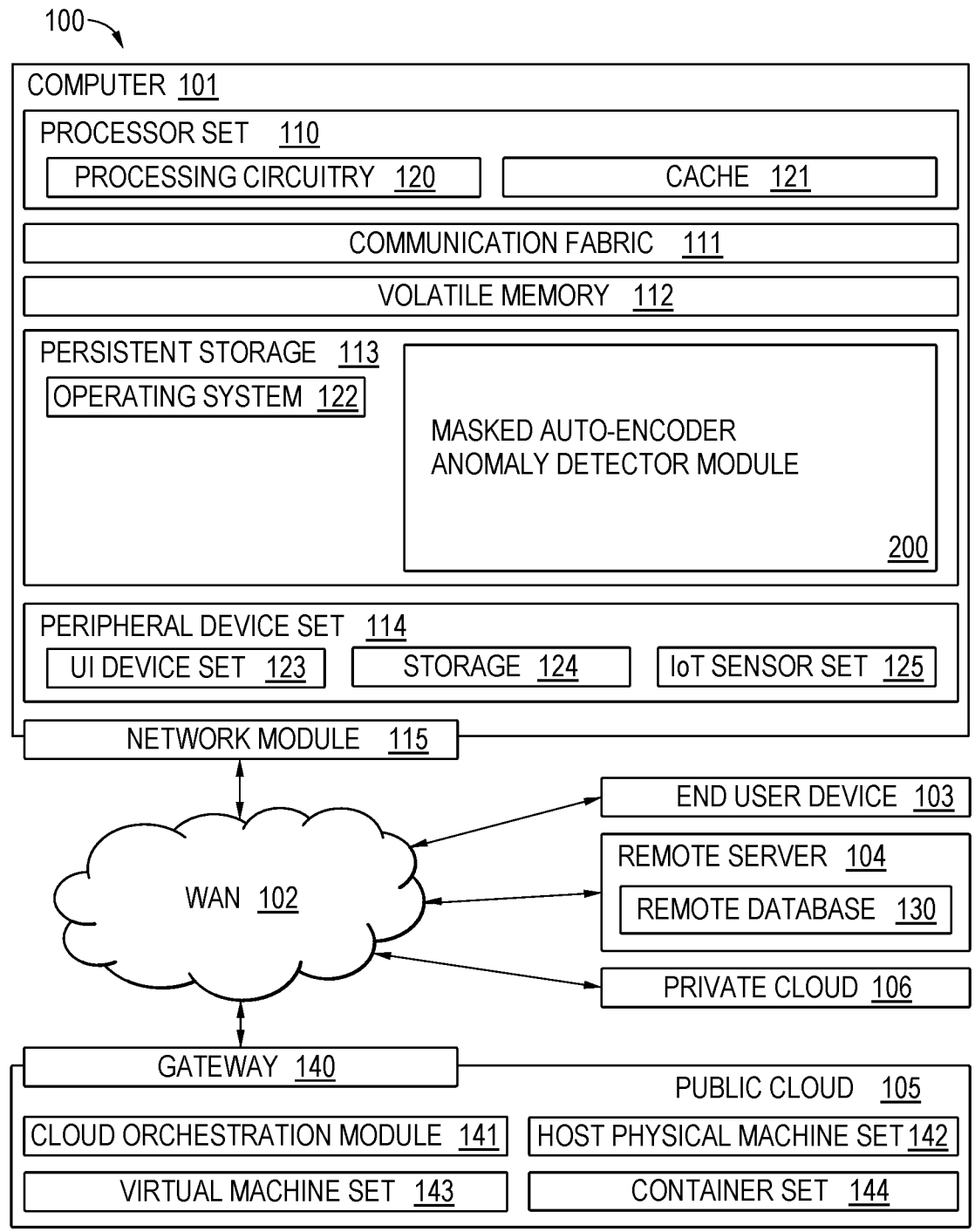
FIG. 1 is a block diagram of an example computing environment that contains an example of an environment for the execution of at least some of the computer code involved in performing the inventive methods, such as a masked auto-encoder anomaly detector module.

The challenge of Anomaly-Detection (AD) stems from the fact that good cases are similar and easy to model, while anomalies rarely happen, and when they do, they can take an unpredictable form. For this reason, classic supervised training may sometimes not feasible for AD. In AD, only good images are provided during training. The goal during training is to model the distribution of the good images and thus detect outliers at inference time when they occur. Two main approaches are used for AD, including embedding-similarity based methods and image-reconstruction based methods. Embedding-similarity based methods utilize a pretrained model to extract and aggregate representations of the reference images or patches. The representation of a query image is compared with those of the reference images to determine if it is anomalous. Image-reconstruction based methods use only reference images to train a model to reconstruct the images from a corrupted observation. For example, the corrupted observation may be a noisy image or a partially masked-out image.

According to embodiments of the present disclosure, an example system includes a processor that can randomly mask tokens using different masks to generate different subsets of masked tokens. The processor can process the different sets of masked tokens via a pretrained masked auto-encoder (MAE) encoder to output intermediate representations. The processor can process the intermediate representations via a pretrained MAE decoder to output reconstructed images. The processor can further compare input image with the output reconstructed images to generate an anomaly score. The embodiments herein thus provide a MAE for Anomaly Detection (AD). In particular, MAE may not be able to reconstruct anomalous regions, such as a scratch, based on their surroundings. The techniques can thus be used in the zero-shot AD case, where no reference images are provided, and the MAE is trained on not necessarily related images. The techniques can also be used in the usual AD setup, where reference images are available. When reference images are available, the reference images can either be used to train or fine-tune the MAE or fed to the MAE together with the non-masked regions of the query image. Thus, embodiments of the present disclosure allow both improved zero-shot anomaly detection and few-shot anomaly detection. In addition, the embodiments may also provide for zero-shot foreign object detection. In particular, the embodiments enable a task of foreign object detection on the ground, with no prior reference to either a free-of-objects surface or to the objects to be detected. For example, this task is treated as a form of zero-shot anomaly detection, where the objects are an anomaly in the surface texture. Example textures include carpets, grids, leather, tile, wood, among other textures. Because training does not involve using examples of the textures, different types of textures may therefore be input during inference without needing to retrain the MAE model in the zero-shot embodiments. Experiments using the embodiments described herein showed better results for this task compared with state-of-the-art few-shot anomaly detection, where an image of the surface is provided for reference. Moreover, the embodiments provide a signal that is orthogonal to other methods, and thus may be used in combination with other methods to provide improved results. In particular, an experiment was conducted combining the techniques described herein with the PatchCore method, released in 2022, to form an ensemble that outperformed existing methods including an ensemble of two PatchCores.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a masked auto-encoder anomaly detector module 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
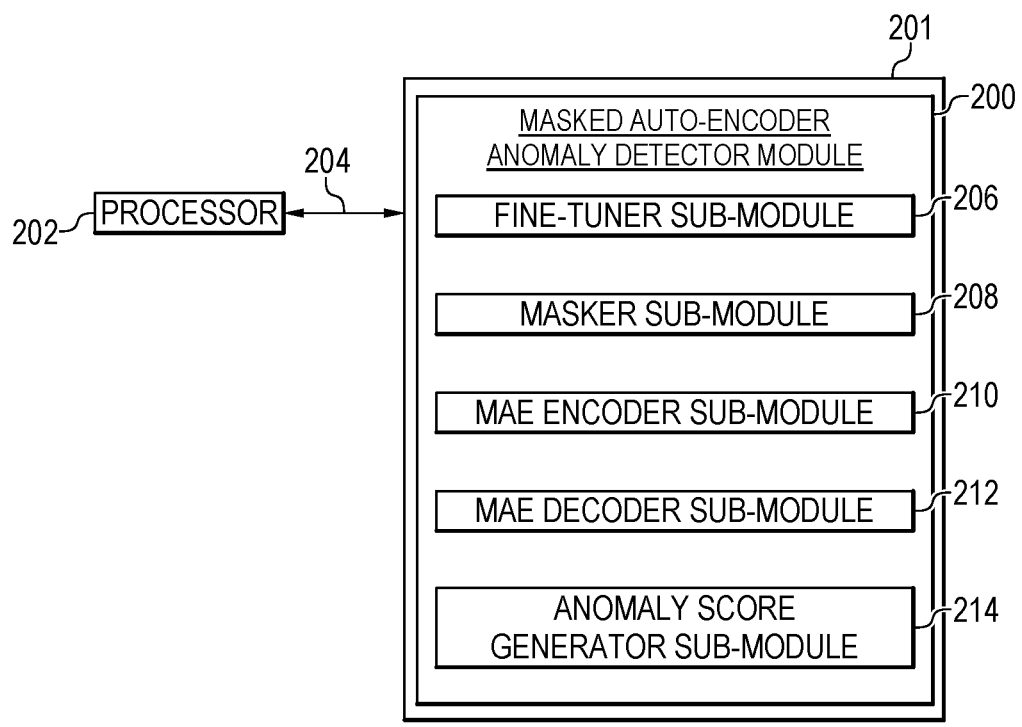
FIG. 2 is an example tangible, non-transitory computer-readable medium that can detect anomalies using a masked auto-encoder.

Referring now to FIG. 2, a block diagram is depicted of an example tangible, non-transitory computer-readable medium 201 that can detect anomalies using a masked auto-encoder. The tangible, non-transitory, computer-readable medium 201 may be accessed by a processor 202 over a computer interconnect 204. Furthermore, the tangible, non-transitory, computer-readable medium 201 may include code to direct the processor 202 to perform the operations of the methods 300 or 400 of FIGS. 3 and 4.

The various software components discussed herein may be stored on the tangible, non-transitory, computer-readable medium 201, as indicated in FIG. 2. For example, the masked auto-encoder (MAE) anomaly detector module 200 includes a fine-tuner sub-module 206 that includes code to fine-tune the pretrained MAE encoder and the pretrained MAE decoder. In some examples, the fine-tuner sub-module 206 also includes code to use an attention mechanism of a transformer to share information between reference tokens and the query tokens. The MAE anomaly detector module 200 includes a masker sub-module 208 that includes code to split an input image into non-overlapping patches and flatten the patches into the tokens. The masker sub-module 208 further includes code to randomly mask tokens using different masks to generate different subsets of masked tokens. The MAE anomaly detector module 200 includes a MAE encoder sub-module 210 that includes code to process the different sets of masked tokens via a pretrained masked auto-encoder (MAE) encoder to output intermediate representations. In some examples, the pretrained masked auto-encoder (MAE) encoder may be a fine-tuned MAE encoder. The MAE encoder sub-module 210 also includes code to process the different sets of masked tokens via the fine-tuned MAE encoder to output the intermediate representations. The MAE anomaly detector module 200 includes a MAE decoder sub-module 212 that includes code to process the intermediate representations via a pretrained MAE decoder to output reconstructed images. For example, the pretrained decoder may have been trained with the pretrained MAE encoder on a large collection of general images. As used herein, general images refer to a large varied set of images that does not necessarily contain the target object or texture images. In some examples, the MAE decoder is a fine-tuned decoder. For example, the MAE decoder sub-module 212 includes code to process the intermediate representations via the fine-tuned MAE decoder to output the reconstructed images. The MAE anomaly detector module 200 includes an anomaly score generator sub-module 214 that includes code to compare input image with the output reconstructed images to generate an anomaly score. In various examples, the anomaly score generator sub-module 214 includes code to channel-wise filter squared error maps with a Gaussian kernel to remove noise and summing the squared error maps over three color channels. In some examples, the anomaly score generator sub-module 214 includes code to calculate a mean of a number of error maps to generate a single error map and calculating a max error of the single error map.

Figure 3:
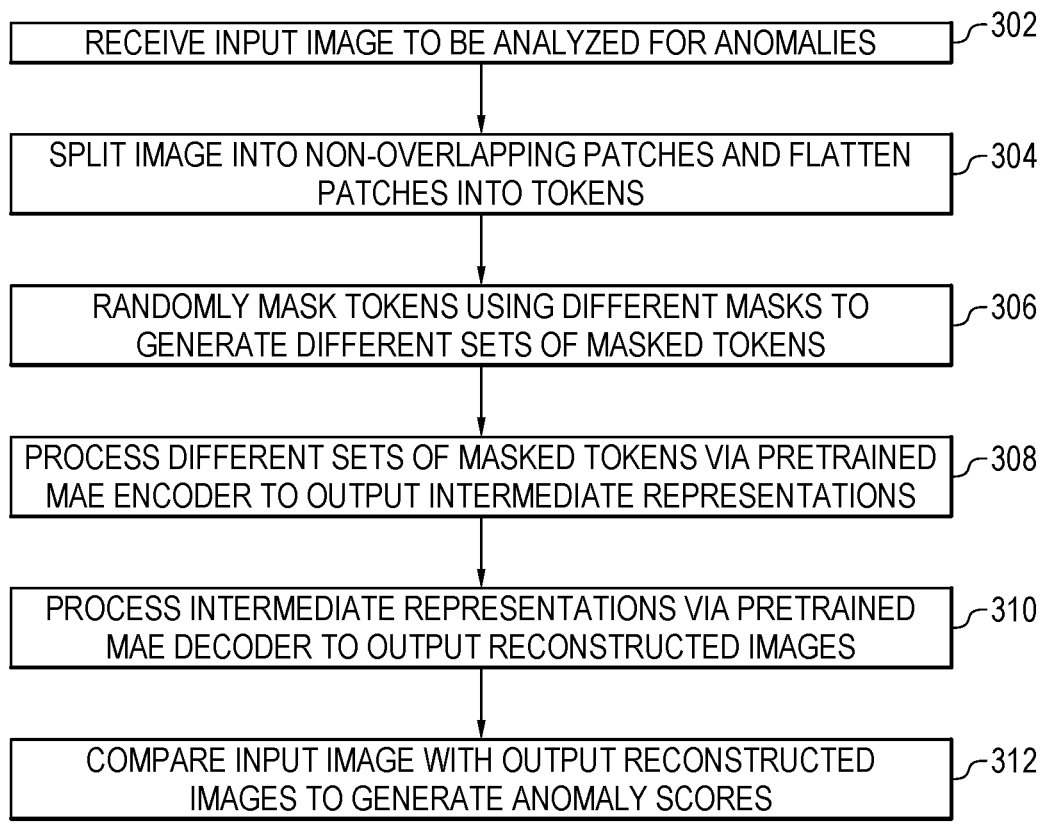
FIG. 3 is a process flow diagram of an example method that can detect anomalies using a masked auto-encoder with zero-shot anomaly detection.

FIG. 3 is a process flow diagram of an example method that can detect anomalies using a masked auto-encoder with zero-shot anomaly detection. The method 300 can be implemented with any suitable computing device, such as the computer 101 of FIG. 1. For example, the methods described below can be implemented by the processor set 110 of FIG. 1.

At block 302, an input image to be analyzed for anomalies is received. For example, the input image may be an image with a pattern such as a texture image. In some examples, the input image may be analyzed for any foreign objects to be detected.

At block 304, the image is split into non-overlapping patches and the patches are flattened into tokens. For example, the patches may be flattened via a linear projection with the addition of a positional encoding and are then processed by a sequence of transformer blocks.

At block 306, the tokens are randomly masked using different masks to generate different sets of masked tokens. For example, most of the tokens may be masked out and thus discarded to generate each of the different sets. As one examples, each of the sets of masked tokens may have a different subset of 25% of the tokens.

At block 308, the different sets of masked tokens are processed via a pretrained masked auto-encoder (MAE) encoder to output intermediate representations. For example, the pretrained MAE encoder may have been trained using a publicly available large collection of general images.

At block 310, the intermediate representations are processed via a pretrained MAE decoder to output reconstructed images. For example, the pretrained MAE decoder may have been trained with the MAE encoder using a publicly available large collection of general images. In various examples, the MAE decoder may receive the output tokens of the encoder and in addition empty tokens with just the positional encoding replacing masked-out tokens.

At block 312, the input image is compared with the output reconstructed images to generate anomaly scores. In various examples, the anomaly scores include an image-level anomaly score. For example, squared error maps can be channel-wise filtered with a Gaussian kernel to remove noise and the squared error maps summed over three color channels. A mean of a number of error maps may be calculated to generate a single error map. A max error of a single error map is then calculated. In some examples, the anomaly scores include pixel-level anomaly scores.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method 300 may include detecting a foreign object in an input image from which the tokens are generated based on the anomaly score.

Figure 4:
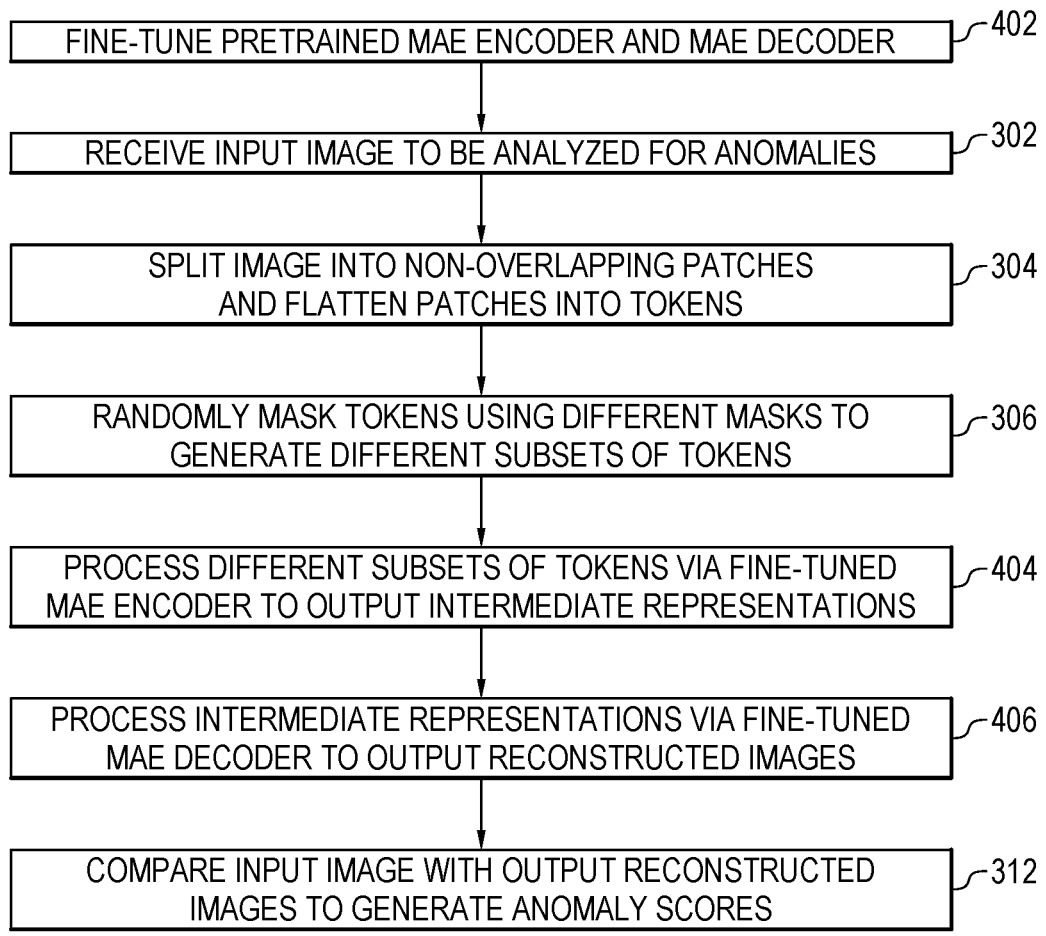
FIG. 4 is a process flow diagram of an example method that can detect anomalies using a masked auto-encoder with few-shot anomaly detection.

FIG. 4 is a process flow diagram of an example method that can detect anomalies using a masked auto-encoder with few-shot anomaly detection. The method 400 can be implemented with any suitable computing device, such as the computer 101 of FIG. 1. For example, the method 400 described below can be implemented by the processor set 110 of FIG. 1. The method 400 includes similarly referenced elements of FIG. 3. In addition, at block 402, a pretrained MAE encoder and MAE decoder are fine-tuned. For example, the MAE encoder and MAE decoder may be fine-tuned on a few samples of images related to images to be processed for anomaly detection. In some examples, the MAE encoder and MAE decoder may be fine-tuned using an attention mechanism of a transformer to share information between reference tokens and the query tokens. For example, as an alternative or an addition to the fine-tuning, patches from the few normal examples can be used in a cross attention to help push the MAE to recover normal-looking images. The cross attention can be used be either in the encoder to affect the representation or in the decoder to affect the reconstruction, or both.

At block 302, an input image to be analyzed for anomalies is received. For example, the input image may be an image of a texture that may include one or more anomalies, which may be one or more objects.

At block 304, the image is split into non-overlapping patches and the patches are flattened into tokens. For example, the patches may be flattened via a linear projection with the addition of a positional encoding and are then processed by a sequence of transformer blocks.

At block 306, the tokens are randomly masked using different masks to generate different sets of masked tokens. For example, most of the tokens may be masked out and thus discarded to generate each of the different sets. As one examples, each of the sets of masked tokens may have a different subset of 25% of the tokens.

At block 404, the different sets of masked tokens are processed via the fine-tuned masked auto-encoder (MAE) encoder to output intermediate representations. For example, the intermediate representations may include one embedding vector per token or patch.

At block 406, the intermediate representations are processed via the fine-tuned MAE decoder to output reconstructed images. For example, the output reconstructed images may not include one or more anomalies in the input image.

At block 312, the input image is compared with the output reconstructed images to generate anomaly scores. For example, squared error maps can be channel-wise filtered with a Gaussian kernel to remove noise and the squared error maps summed over three color channels. A mean of a number of error maps may be calculated to generate a single error map. A max error of a single error map is then calculated.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the method 400 may include detecting a foreign object in an input image from which the tokens are generated based on the anomaly score.

Figure 5:
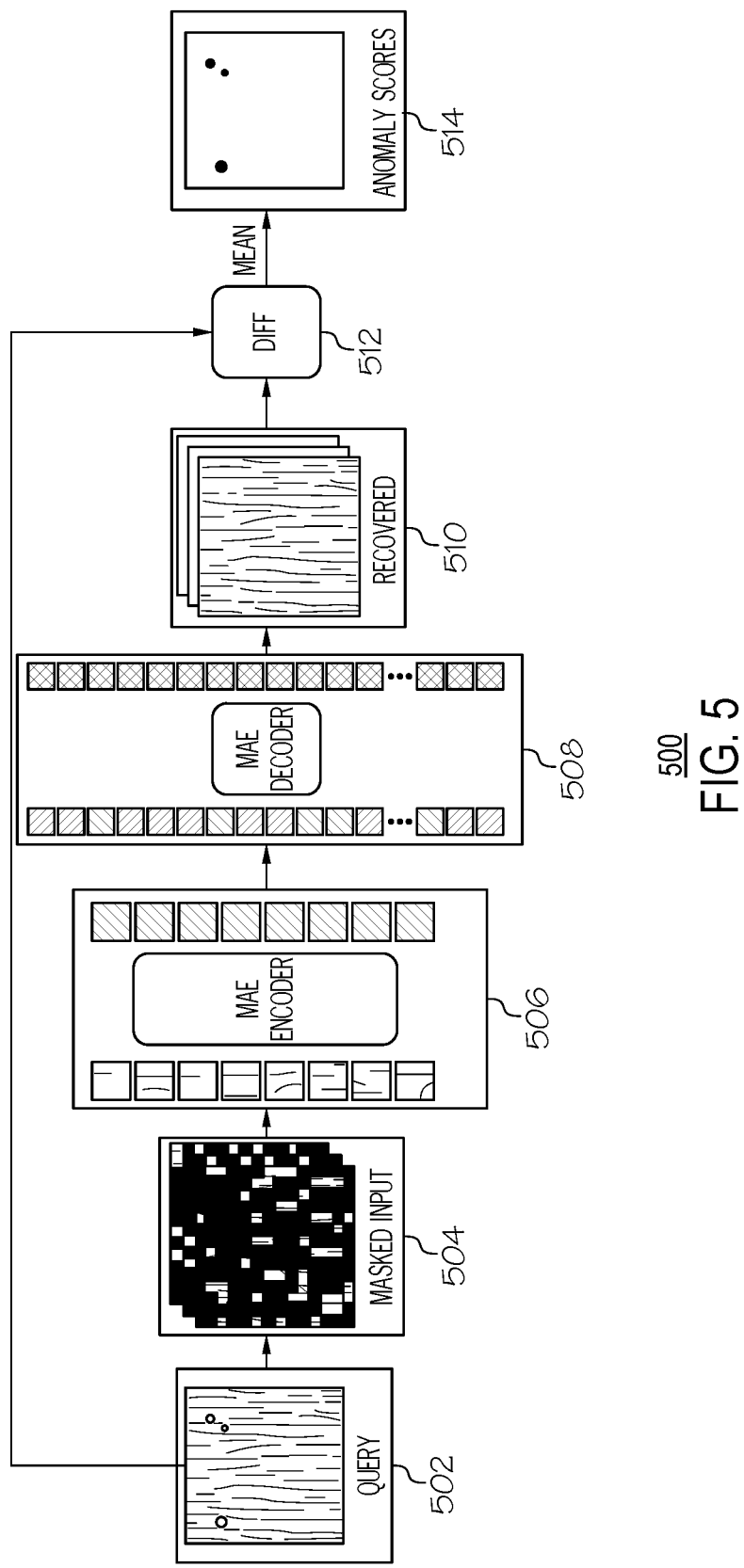
FIG. 5 is a block diagram of an example system for detecting anomalies using a masked auto-encoder.

With reference now to FIG. 5, a block diagram shows an example system for detecting anomalies using a masked auto-encoder. The example system 500 of FIG. 5 includes a query 502. For example, the query 502 may be an image to be analyzed for anomalies. The system 500 includes masked input 504 shown being generated from query 502. The system 500 also includes an MAE encoder 506. In some examples, the MAE encoder 506 may be a pretrained MAE encoder 506. In some examples, the MAE encoder 506 may be a fine-tuned MAE encoder. For example, the MAE encoder may be fine-tuned using low-rank adaptation of large language models (LoRA). The system 500 also includes a MAE decoder 508. For example, the MAE encoder 508 may be a pretrained MAE decoder that is pretrained with the MAE encoder 506. In some examples, the MAE decoder 508 may be a fine-tuned MAE decoder that has been fine-tuned with MAE encoder 506. The system 500 also includes recovered image 510. For example, the recovered image 510 may be a recovered version of the input image of query 502. The system 500 includes an anomaly score generator 512 that generates anomaly scores 514 based on the query 502 and the recovered image 510. For example, the anomaly scores may include an image-level anomaly scores, a pixel-level anomaly scores, or any combination thereof.

In the example of FIG. 5, the system 500 may be used for both zero-shot anomaly detection and few-shot anomaly detection. In particular, for zero-shot anomaly detection is based on image reconstruction from partial observations. In various embodiments, a masked auto-encoder (MAE) is trained on the self-supervised task of predicting an image from a partial observation. For example, the MAE may be an ImageNet pretrained MAE. The MAE is thus used as a backbone for the system 500. In various examples, an input image I from query 502 is split into non-overlapping patches. Each of the patches is flattened into a single token. In various examples, the tokens are processed via a linear projection with the addition of a positional encoding and are then processed by a sequence of transformer blocks. For an MAE, most of the input tokens are masked out and discarded, therefore the MAE encoder 506 operates on a small number of tokens. The MAE decoder 508 receives the output tokens of the encoder and in addition empty tokens with just the positional encoding replacing masked-out tokens. Through a sequence of transformer blocks, the decoder fills these empty tokens based on information from the encoder output tokens. For example, filling the empty tokens may include an interpolation of available patches based on natural images statistics. The output of the MAE decoder 508 is the recovered image 510.

Usually, at inference time with typical MAEs, only the MAE encoder 506 is used for feature extraction, while the decoder 510 that was used during training the MAE is discarded. In various embodiments, both the MAE encoder 506 and MAE decoder 508 are used in system 500. In particular, given a query 502 image, randomized small subsets of its patches are fed to the MAE. As one example, each of the subsets may be 25% of the patches. In various examples, other subset sizes may be used. The anomaly score generator 512 can then compare the recovered images 510 against the query image 502. For example, mismatched pixels may indicate an anomalous regions. In various examples, the masking process is repeated multiple times for each input query image 502, and each time a different subset of the tokens is retained. After a number of repetitions, each token is likely to be masked out at least once such that we can be measured how well it is reconstructed. In experiments performed using 32 repetitions, it was found that the reconstruction for retained tokens (not masked-out) is also somewhat indicative of them being normal versus anomalous. For example, because the transformer mixes the information from all tokens, even when a token is visible, the token will be better reconstructed when it is in agreement with its surrounding tokens. Therefore, given this observation, a query image N 502 may be run times with different random masks and the system 500 can compare the N reconstructed images 510 (full images) against the query image 502.

As one formal example, given a query image $I \in \mathbb{R}^{H \times W \times 3}$ and a set of N random masks $\{M_1, \ldots, M_N\}$, the query image I is processed via the MAE encoder 506 and decoder 508 to obtain N reconstructed images $\{R_1, \ldots, R_N\}$, where each of the reconstructed images may be obtained using the equation:

$$R_i = MAE(I \cdot M_i) \qquad \text{Eq. 1}$$

In various examples, image resolution and patch size may be the same as those used for pretraining the MAE encoder and decoder. For example, the image resolution may be 224 pixels and the patch size may be 16 pixels. In various examples, the system 500 can then use $R_i$ to compute N squared error maps. For example, the squared error maps may be channel-wise filtered with a Gaussian kernel g to remove noise. As one example, the Gaussian kernel g may have a kernel size of 7, and a parameter $\sigma=1.4$. The squared error maps may then be summed over three color channels. For example, the squared error maps may be summed using the equation:

$$E_i = \sum_{c \in \{R,G,B\}} (I^C - R_i^C)^2 * g \qquad \text{Eq. 2}$$

In various examples, the system 500 can average the N error maps to get a single error map. For example, the N error maps may be averaged using the equation:

$$E = \frac{1}{N} \sum_{i=1}^{N} E_i \qquad \text{Eq. 3}$$

where E is the pixel-level anomaly score. In various examples, an image-level anomaly score is set by the max error of the pixel-level anomaly score. For example, the image-level anomaly score may be obtained using equation:

$$S = \max(E) \qquad \text{Eq. 4}$$

In various embodiments, the system 500 can also be used for few-shot anomaly detection. For few-shot anomaly detection, the system 500 can first fine-tune the MAE model with available reference images. Unlike MAE, where the loss is applied only on the recovered masked out patches, the system 500 can apply a loss to all patches during the fine-tuning. The loss may be applied to all patches because the system 500 may use all predicted patches (both masked and unmasked) for detecting anomalies using few-shot anomaly detection. In some examples, the system 500 can use low-rank adaptation of large language models (LoRA) for the fine-tuning. For example, LoRA is a method originally introduced for finetuning large language models, such as transformers, without overfitting a small dataset. In LoRA, an additional low-rank weight matrix is introduced for each weight matrix in the original pre-trained model. The low rank is enforced by having a low-rank decomposition. During fine-tuning, only the low-rank weights are updated and the output of each multiplication is the sum of performing the multiplication with the original weights and the new low-rank weights. After fine-tuning is finished, the weights are updated to be the sum of the original weights and the new weights to avoid additional computation and memory consumption at inference time.

As one example of fine-tuning the MAE encoder 506 and decoder 508, the rank of the additional LoRA weights was set to 32 for all tensors in the MAE model. The MAE model was trained for 50 iterations using an SGD optimizer with a learning rate of 1e−2 (because LoRA uses a relatively high learning rate), a momentum of 0.9, and weight decay of 0.05. The MAE model was further trained with random crop and random rotation augmentations. The batch size was set to 32, so the few available shots are used multiple times to fill the batch, but with different random masks each time.

In some embodiments, the system 500 can be modified to better use the few available shots in the few-shot anomaly detection setup. For example, the system 500 can feed the model tokens (patches) from both the query image 502 and the reference image(s) (not shown) during training. The MAE model can be trained to use the attention mechanism of the transformer to share information between the reference tokens and the query tokens. In this way, the recovered patches are not just guessed according to their surrounding patches but are more likely to fit the normal patch distribution.

Still referring to FIG. 5, in various examples, the system 500 may also be used to perform zero-shot foreign objection detection (FOD). FOD is a very important task in several real-world scenarios. For example, FOD may be used in airport runways, where even very small objects on the ground can be dangerous for the planes. Unlike classic FOD, where models are trained for detecting specific types of objects, the system 500 has no training data of either an empty surface or the objects to be detected provided. The system 500 can thus treat FOD as detecting anomalies in a background surface texture. As one example, videos of the ground in two environments were captured, including indoors (wooden floor) and outdoors (asphalt pavement). Some of the frames contained foreign objects. For example, the foreign objects included larger tools, such as a wrench, and smaller objects, such as a bolt. 20-50 frames were extracted and labeled with foreign objects and a similar number without any object for each of the environments.

As one specific application example, images of a runway of an airport may be input into the system 500 for detecting foreign objects. The system 500 may output anomaly scores for the input images. The anomaly scores may then be used to identify foreign objects such as screws, bolts, among other foreign objects which may be lying on the runway.

It is to be understood that the block diagram of FIG. 5 is not intended to indicate that the system 500 is to include all of the components shown in FIG. 5. Rather, the system 500 can include fewer or additional components not illustrated in FIG. 5 (e.g., additional queries, masked inputs, recovered images, subset sizes, comparison methods, or additional numbers or types of anomaly scores, etc.). In some examples, the system 500 may be combined with other methods, such as PatchCore, to produce an ensemble that generates improved anomaly scores.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
randomly mask tokens using different masks to generate different subsets of masked tokens;
process the different subsets of masked tokens via a pretrained masked auto-encoder (MAE) encoder to output intermediate representations;
process the intermediate representations via a pretrained MAE decoder to output reconstructed images; and
compare an input image with the output reconstructed images to generate an anomaly score, wherein generating the anomaly score comprises channel-wise filtering squared error maps with a Gaussian kernel to remove noise.

2. The system of claim 1, wherein the processor is to split the input image into non-overlapping patches and flatten the patches into the tokens.

3. The system of claim 1, wherein the MAE encoder and the MAE decoder are pretrained on a large collection of general images.

4. The system of claim 1, wherein the processor is to fine-tune the pretrained MAE encoder and the pretrained MAE decoder, process the different subsets of masked tokens via the fine-tuned MAE encoder to output the intermediate representations, and process the intermediate representations via the fine-tuned MAE decoder to output the reconstructed images.

5. The system of claim 1, wherein generating the anomaly score further comprises summing the squared error maps over three color channels.

6. The system of claim 1, wherein generating the anomaly score comprises calculating a mean of a plurality of error maps to generate a single error map.

7. The system of claim 1, wherein the anomaly score comprises an image-level anomaly score, and wherein generating the image-level anomaly score comprises calculating a max error of pixel-level anomaly scores of an error map.

8. The system of claim 1, wherein the anomaly score comprises a pixel-level anomaly score.

9. A computer-implemented method, comprising:
randomly masking, via a processor, tokens using different masks to generate different subsets of masked tokens;
processing, via the processor, the different subsets of masked tokens via a pretrained masked auto-encoder (MAE) encoder to output intermediate representations;
processing, via the processor, the intermediate representations via a pretrained MAE decoder to output reconstructed images;
fine-tuning, via the processor, the pretrained MAE encoder and the pretrained MAE decoder, and processing the different subsets of masked tokens via the fine-tuned MAE encoder to output the intermediate representations; and
comparing, via the processor, an input image with the output reconstructed images to generate an anomaly score.

10. The computer-implemented method of claim 9, further comprising splitting, via the processor, the input image into non-overlapping patches and flatten the patches into the tokens.

11. The computer-implemented method of claim 9, further comprising processing the intermediate representations via the fine-tuned MAE decoder to output the reconstructed images.

12. The computer-implemented method of claim 11, wherein fine-tuning the pretrained MAE encoder and the pretrained MAE decoder comprises using an attention mechanism of a transformer to share information between reference tokens and query tokens.

13. The computer-implemented method of claim 9, wherein generating the anomaly score comprises channel-wise filtering squared error maps with a Gaussian kernel to remove noise and summing the squared error maps over three color channels.

14. The computer-implemented method of claim 9, wherein generating the anomaly score comprises calculating a mean of a plurality of error maps to generate a single error map.

15. The computer-implemented method of claim 9, wherein generating the anomaly score comprises calculating a max error of a single error map.

16. The computer-implemented method of claim 9, comprising detecting, via the processor, a foreign object in the input image from which the tokens are generated based on the anomaly score.

17. A computer program product for generating anomaly scores, the computer program product comprising a computer-readable storage medium having program code embodied therewith, the program code executable by a processor to cause the processor to:
randomly mask tokens using different masks to generate different subsets of masked tokens;
process the different subsets of masked tokens via a pretrained masked auto-encoder (MAE) encoder to output intermediate representations;
process the intermediate representations via a pretrained MAE decoder to output reconstructed images;
fine-tune, via the processor, the pretrained MAE encoder and the pretrained MAE decoder by using an attention mechanism of a transformer to share information between reference tokens and query tokens; and
compare an input image with the output reconstructed images to generate an anomaly score.

18. The computer program product of claim 17, further comprising program code executable by the processor to split the input image into non-overlapping patches and flatten the patches into the tokens.

19. The computer program product of claim 17, further comprising program code executable by the processor to process the different subsets of masked tokens via the fine-tuned MAE encoder to output the intermediate representations, and process the intermediate representations via the fine-tuned MAE decoder to output the reconstructed images.

20. The computer program product of claim 17, further comprising program code executable by the processor to generate the anomaly score by channel-wise filtering squared error maps with a Gaussian kernel to remove noise.

* * * * *